United States Patent [19]

Wisotzky et al.

[11] 3,781,482

[45] Dec. 25, 1973

[54] PULSE-CORRECTING SYSTEM FOR A TELEPHONE SIGNALING SYSTEM

[75] Inventors: Otto G. Wisotzky, San Francisco; Tom L. Blackburn, San Jose; Roy J. G. Urbach, Redwood City, all of Calif.

[73] Assignee: GTE Automatic Electric Laboratories Incorporated, Northlake, Ill.

[22] Filed: Jan. 31, 1972

[21] Appl. No.: 222,183

[52] U.S. Cl. .............................. 179/16 EA, 328/164

[51] Int. Cl. .............................. H04q 1/36

[58] Field of Search .............................. 179/15 AD, 16 E, 179/16 EA, 16 EC, 16 F; 328/164; 307/132 R, 133

[56] References Cited

UNITED STATES PATENTS

| | | | |
|---|---|---|---|
| 3,700,821 | 10/1972 | Savage | 179/16 EA |
| 3,671,875 | 6/1972 | Pento | 307/234 |
| 3,659,055 | 4/1972 | Witmore | 179/16 E |
| 3,504,290 | 3/1970 | Earle | 179/16 EA |
| 3,452,220 | 6/1969 | Fritschi | 179/16 E |
| 3,092,691 | 6/1963 | Burns et al. | 179/16 EA |

*Primary Examiner*—William C. Cooper
*Assistant Examiner*—Randall P. Myers
*Attorney*—K. Mullerheim et al.

[57] ABSTRACT

Pulse correcting circuitry, including three timing means, which provide minimum "break" and "make" pulse intervals at a receiving terminal. A first timer delays and subtracts a first predetermined time duration from the input pulse and delays the appearance of the pulse at the output of the first timer by this first predetermined time duration. A second timer is operatively connected with the first timer and prevents activation of the first timer for a second predetermined time interval in order to prevent operation of the pulse correcting circuitry on spurious pulses. Following the second predetermined time interval, the state of the outputs of the second timer are set and they are held for a third predetermined time interval. When the first and second timers permit an output to occur from the first timer, a third timer is activated and this timer insures that the pulse output has a minimum length. Where the input pulse to the first timer is longer than the minimum length, the output pulse is equal to the input pulse.

12 Claims, 2 Drawing Figures

PATENTED DEC 25 1973

3,781,482

SHEET 2 OF 2

PULSE-CORRECTING SYSTEM FOR A TELEPHONE SIGNALING SYSTEM

BACKGROUND OF THE INVENTION

This invention relates to dial pulse repeating and correcting circuits and more particularly to pulse repeating and correcting circuits which utilize integrated circuit logic networks to provide the timing necessary for pulse correction of a dial pulse signal. While tone dialing techniques are presently being introduced for use in the telephone switching network, it is well known that many of the telephone switching systems that provide control functions as well as supervisory indications are transmitted in the form of direct current pulses. The common and almost universal use of dial pulses under the control of the calling customer, or an operator for extending a connection, is an illustration of this type of signaling.

Each so-called dial pulse includes two basic elements referred to as the "make" interval and "break" interval of a pulse. As used in connection with dial pulsing the "make" interval encompasses the period of time during which the dial pulse contacts are closed, whereas the "break" interval refers to the period of time during which the dial pulse contacts are open. A particular train of dial pulses is designed to conform to certain minimum time durations for both the "break" interval and "make" interval of a dial pulse. For example, if a dial pulse rate of 10 pulses per second is assumed the sum of the "make" and "break" intervals for each pulse is equal to 100 milliseconds. Proper operation of the dial switching equipment requires that the "break" interval be considerably longer, about one and one-half times as long as the "make" interval. For the instant example, the desired "break" interval is approximately 60 milliseconds and the desired "make" interval is approximately 40 milliseconds.

The necessity for maintaining appropriate minimum intervals for both the "break" and "make" intervals of the dial pulse has been the subject of numerous innovations. This requirement may occur either at the transmitting of the receiving end of the signaling system or it may be necessary to use pulse correction at both terminal ends in order to insure that the minimum pulse intervals are obtained. One cause of the problem at the transmitting end is that the subscriber who is dialing a particular number does not allow the dial to run freely under its own spring pressure but in fact forces the dial to return at a different rate from that set by the governor. This adversely affects the "break"–"make" ratio and can cause pulse distortion. A technique for correcting the pulse at the transmitting terminal is described in a copending application entitled "Dial Pulse Correcting Circuit" by Otto G. Wisotzky U.S. Pat. Ser. No. 222,175, filed Jan. 31, 1972. It is also well known that the transmission path between the subscriber's circuit and the switching equipment can affect the pulse so that it becomes distorted and modified in time duration so as to adversely affect the "break"—"make" ratio, by its passage through the inductive and capacitive impedances of the subscriber loop circuit.

Transmission of the dial pulse signal through the switching office and the transmission equipment to a receiving terminal also can introduce distortion and a modification in time duration of the pulses which also adversely affects the dial pulse signal and may cause sufficient distortion so that dialing errors could occur.

In either case correction of the dial pulse signal is desired and maintenance of minimum 37 make" and minimum "break" pulse intervals are necessary to proper performance of the switching equipment.

SUMMARY OF THE INVENTION

In its broad aspects, the present invention contemplates the use of three timing circuits which co-act to provide minimum timing intervals for the "make" and "break" intervals of the dial pulse. An input or first timing means accepts the dial pulse conditions from the receiving circuitry of a signaling receiver and delays the output of the pulse for a first predetermined time interval. This time interval is subtracted from the input pulse length in the first timing means but is added later by a third or output timing means provided the pulse length at the input to the input timer is of sufficient duration to permit the appearance of an output pulse. A second or guard function timing means which is operatively connected to said input timing means provides a second predetermined time interval. The guard function timing means applies to the logic output circuitry of the input timing means a first binary logic state during the idle circuit condition of the signaling system, and the other binary logic state when a "break" condition has occurred and is present for the first predetermined time interval. The other binary state is applied to the output logic circuitry of said input timing means for a second predetermined time interval in order to prevent operation of the pulse correcting circuitry by spurious signals.

Once the pulse input to the input timer has exceeded the first predetermined timing interval any interruptions of the input pulse signal are integrated in the input timer. In order to provide the desired integration, the discharage rate of the timing means in the first input timer under this condition has a 2:1 ratio in comparison to that of the discharge rate of the primary timing means. The interruptions of the input pulse signal are often called "splits" and these may be caused by disturbances in the transmission path or in dial pulsing. By using a slower discharge rate "splits" can occur without causing a dropout or interruption of the pulse correction circuitry.

At the end of the second predetermined time interval, the guard timing means is placed in another operating mode; and the output conditions from the output logic circuitry are set and held for a guard time period that is greater than the pulse intervals of the dial pulse train. Thus the output conditions from the guard timing means are applied for this period to the input and output timing means.

With the appearance of a pulse output at the output of the logic for the input timing means, the output timing means is activated and a pulse appears at its output through the output logic circuit. The timing circuitry of the output timing means is not activated until the input pulse changes state. This change of state appears at the output of the input timing means logic circuitry almost as quickly as it appears at the input and affects the input timing circuitry of the output timing means such that the logic output of the output timing means is held to provide a minimum pulse output as determined by the timing circuitry. If the input pulse to the input timing means is of shorter duration than the desired minimum output pulse from the output timing means, the timing circuitry in the output timing means will add sufficient time to the pulse via the output logic circuitry to insure that the minimum output pulse length has occurred. If the input pulse is longer than that desired for the minimum pulse length, then the output pulse will have added to it the first predetermined time duration which was subtracted from the input pulse by the input timing means. In this case, the output pulse will have the same length as the original input pulse. If the input pulse is greater than the guard time period then the output timing means will add on an interval in excess of that which was subtracted by the input timing means. This occurs because of the effect of the time-out of the guard timing means which changes the timing circuit in the output timing means, adding to it additional time delay to insure that the output pulse will be adequate for the guard time period.

DETAILED DESCRIPTION

Figure 1:
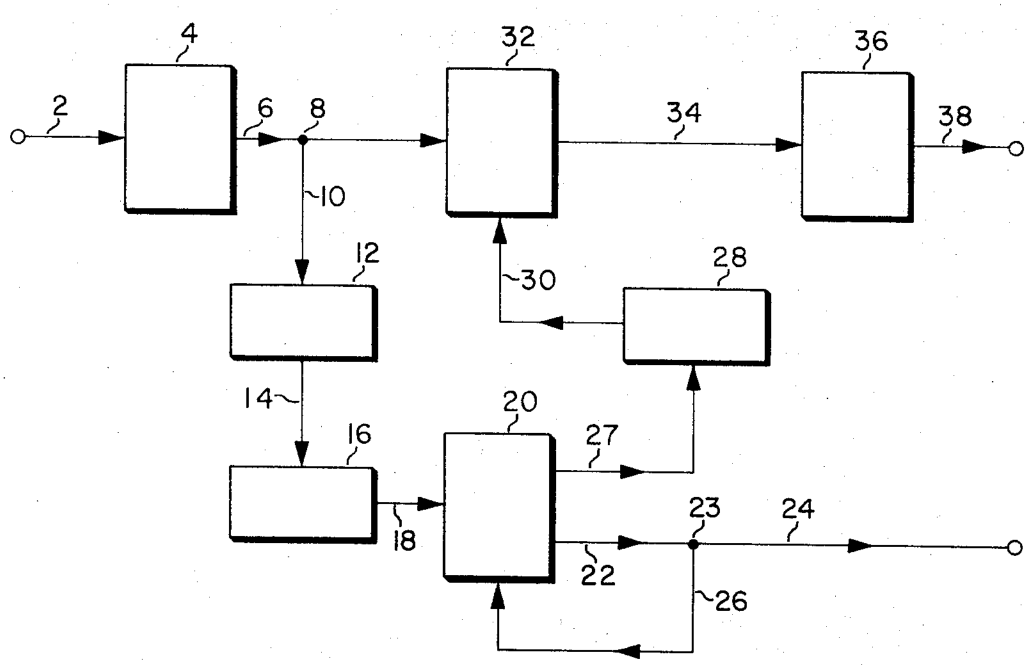
FIG. 1 is a block diagram of the receiving circuit including the voice transmission path, the impedance matching devices, guard functions and filters which are used in a single frequency signaling system that is commonly employed for transmission of signaling information. A portion of the circuitry shown in block form is used for pulse correction and it is the relationship of the pulse correction circuitry to the total receiving circuitry that is exemplified.

One technique commonly employed in the transmission of the dial pulsing information is to use a single frequency, such as for example 2,600 Hz, to transmit the dial pulse information by keying this 2,600 Hz on and off at a transmitting terminal. Thus the signaling information is transmitted within the voice transmission path of the telephone channel. Because of this it is necessary and desirable to provide means for eliminating this frequency from the receiving drop circuit of the telephone system so that the 2,600 Hz signal does not enter the telephone station receiver equipment. In FIG. 1 a general block configuration of the receiving circuitry that may be used is illustrated. The voice frequency information enters on lead 2 and passes through an impedance matching network 4 which generally converts between balanced and unbalanced conditions of the line circuitry. The output of the impedance matching network 4 is applied to line 6 which passes to the voice frequency path switching circuitry 32. This circuitry 32 is under control of the signaling information. When a high level signal frequency signaling tone is present, the circuitry 32 is operated to open the voice frequency path to the receiving drop circuitry. In present day practice, two voice-frequency paths are commonly used. One includes a filter which has a band stop at the signaling frequency and the other is a through path. Switching is between these paths. This approach is used because it is often necessary to permit operator assistance on calls. The band stop filter permits such assistance by voice without the presence of the signaling frequency at the operator station.

At junction 8 the voice frequency and signal paths separate and the signaling information passes along lead 10 to single frequency filter 12 whose output is connected by lead 14 to the detector and rectifier circuit 16. The detector and rectifier circuit puts out a signal pulse in response to the high level single frequency signaling tone conditions at its input. The output is a d.c. condition, digital in nature and is applied via the interconnection path 18 to the pulse corrector 20. Again, in practical applications both the voice frequency without signaling tone and the single frequency signaling tone paths are used. These are useful in providing protection against "talk-off," i.e., the disruption of the circuit because of the presence of 2,600 Hz tone in the speech signal.

Pulse correction circuitry 20 is used to correct the signaling pulses and this may include distortion at the originating pulse unit, i.e., telephone dial pulse distortion or distortion that is subsequently introduced. For example, distortion may be introduced in the sending office, in the transmission medium, in the receiving office equipment or it may result from all of the above mentioned potential distorting elements.

The corrected output is applied via lead 22, junction 23, lead 24 to the office equipment to provide the dial signaling information. At junction 23 a portion of the output is fed back via lead 26 and forms a part of the control information for the logic circuitry involved in the pulse correction circuits. A second output from pulse correction circuitry 20 is applied via lead 27 to the control circuitry 28 which operates the voice frequency path switching circuitry. This switching circuitry control opens the voice frequency talking path during signaling as explained hereinabove and maintains this control for a predetermined time interval. The control information from control circuitry 28 passes along interconnecting lead 30 to the voice frequency path switching circuitry 32 which operates to control the characteristic of the voice frequency path to the receiving drop when a high level single frequency signaling tone is present. The output from the voice frequency path switching circuitry 32 interconnects via path 34 to the impedance matching network 36 and thence from 36 to the voice frequency drop circuitry of the telephone office via path 38.

Applicants' invention may be used directly with digital pulse circuits or with a single frequency signaling system similar to that described above. When used with a single frequency signaling system the pulse correction circuitry is generally connected to the voice frequency path as shown in FIG. 1. The pulse corrector of the instant invention operates only on the d.c. pulse output, e.g., of detector-rectifier 16, derived from the single frequency signaling tone. Thus the input on path 18 to pulse correction circuitry 20 comprises the area of concern of the instant invention. A circuit for performing the pulse correction in accordance with applicants' invention is shown in detail in FIG. 2

Figure 2:
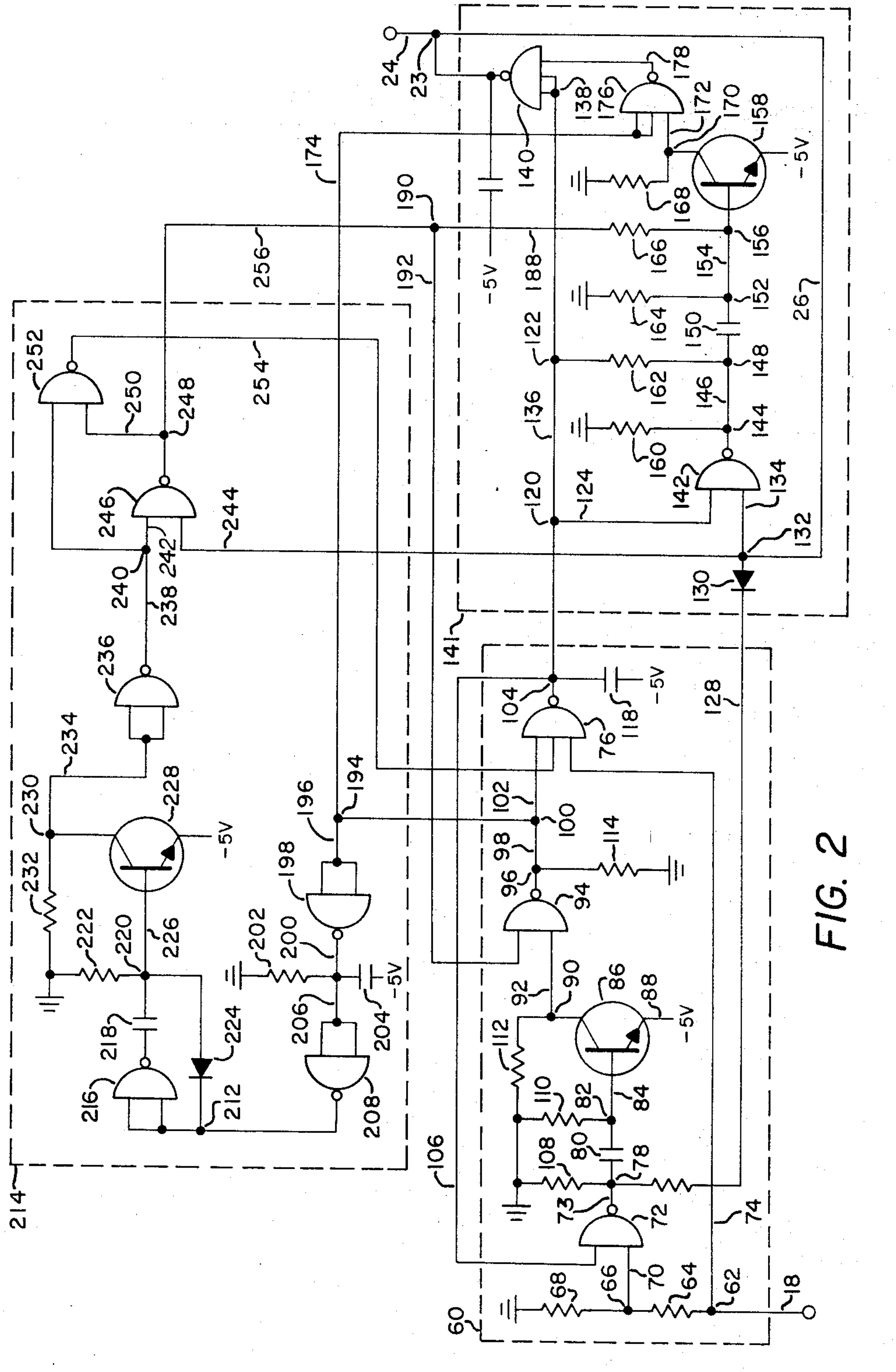
FIG. 2 is a schematic diagram of one specific embodiment which illustrates applicants' pulse correction technique.

Referring now to FIG. 2, it is seen that the pulse correcting circuitry is made up of three timing and logic circuits. The first or input timing and logic circuitry is designated 60. The second or guard function timing and logic circuitry is designated 214. The third or output timing and logic circuitry is designated 141. To perform the desired pulse correction, timing and logic functions, the three timing and logic circuits are interconnected and the purpose and function of these interconnections will be described hereinbelow.

The input and output paths of the pulse corrector are identified by the same numbers as were used in FIG. 1. Thus the inputs to the pulse corrector will appear on input path 18. These are binary signals, designated 1 or 0 to represent ground or negative battery (−5 volts), respectively, which is provided by the pulse signal and detected and rectified by circuit 16, FIG. 1. The logic representation is only one that may be used and is representative of that commonly used in practical applications. Further, the battery is normally negative in telephone offices but may be of different voltage values. The use of −5 volts is not restrictive, but is useful when low level logic circuits are employed.

In the idle condition there is a 0 input on path 18 and this applies a 0 output to NAND-gate 76 via lead 74. The output of gate 76, and hence input timer 60, is a 1. The input gate, NAND-gate 72, has 1 and 0 inputs and so it also has a 1 output. Transistor 86 is biased to conduct and its base is, therefore, approximately −4 volts. Timing capacitor 80 is then charged to a voltage of approximately 4 volts with the gate 72 output side positive.

Logic gate 94 has an 0 input because of the conducting state of transistor 86 whose collector is approximately −5 volts. Thus, gate 94 has a 1 output. The other input to gate 94 is a 1 as will be explained below.

The guard function timer, designated 214 in FIG. 2, has a 1 input from the input timer NAND-gate 94 output via path 98, junctions 100 and 194, and path 196. Gates 198, 208, 216 and 236 act as inverters to change the state of the logic condition from input to output. Gate 198 accepts the 1 input and converts it to an 0 on path 200. The RC circuit in the output provides a 10 millisecond (hereinafter ms) delay before a 1, appearing at the output of gate 198, will cause gate 208 to change state. However, in the idle circuit condition, gate 208 has a 0 input and a 1 output. Diode 224 is back-biased and gate 216 converts that 1 at its input to a 0 at the output. This would intially turn transistor 228 off until the resistor 222 — capacitor 218 timing circuit has timed out. After time-out transistor 228 will be biased on via base resistor 222 and will apply a 0 input to gate 236, which is converted to a logic 1 and applied as one input to gate 246 via path 238, junction 240 and path 242 and also is applied via junction 240 as one input to gate 252. The other input to gate 246 is supplied by the output timer via junction 236, path 126, junction 132 and path 244. The output of gate 246 provides the second input to gate 252. The output of gates 246 and 252 thus depend upon the output state of the output timer which is designated 141 in FIG. 2. In this idle circuit condition the output from gate 140 is a logic 0. Gate 246 thus has 1 and 0 inputs and provides a 1 at its output. This output condition is applied as one input to gate 252 which now has 1 and 1 inputs, thus causing the output to be a logic 0. The output of gate 252 is applied as one input to the output gate 76 of the input timer via path 254 and will hold the output state to a 1 until there is a change in the state of guard function timer.

A pulse appearing as a ground on input lead 18 causes junction 66, of the voltage divider consisting of resistors 64 and 68, to become positive, i.e., a logic 1, more rapidly than junction 62. This is necessary because NAND-gate 72 must be activated prior to the time that the input on lead 74 to NAND-gate 76 becomes a logic 1. NAND-gate 72 no has 1 and 1 inputs and thus provides a 0 output. This, in conjunction with the charge on timing capacitor 80, biases transistor 86 off.

NAND-gate 94 now has 1 and 1 inputs and provides a 0 output. This 0 condition applied to one input of gate 76 will hold a 1 output state from 76 until the input timer times out. Thus, following application of a pulse to the input timer, there is a delay of a first predetermined time interval before gate 76 can change its output state.

The gate 94 output also is applied to gate 198 via junctions 100 and 194 and lead 196. Gate 198 output begins to move to 1 but the RC timing network at its output delays the change of state for about 10 ms. This is the minimum pulse length that is necessary for the timing circuitry to begin to operate. The RC timing network at the output of gate 198 provides the second predetermined time interval. An input pulse must last for this second predetermined time before its presence will be recognized. However, this interval which has a duration of 10 ms in this example will only be integrated with other pulses to generate a minimum pulse length. It is apparent that if the input pulse goes back to 0 before the input timer times out and if it stays at 0, than the state of the output of the output timer will not change. The 10 ms length is the shortest interval that is acceptable in a "split." The charging path provided by pull-up resistor 108 creates an integration ratio of about 2:1 so that the timing capacitor does not charge as rapidly as it discharges, about one-half the rate, so that momentary interruptions of a pulse are bridged over.

Following the 10 ms interval, gate 208 has a 0 output which is applied to the cathode of diode 224 via path 210 and junction 212. Transistor 228 is biased off by the bias voltage developed between ground, resistor 222, junction 220 and diode 224. At the same time timing capacitor 218 is charged to about 4 volts because the gate 216 output is now 1 and the junction 220 side of capacitor 218 is negative.

The collector of transistor 228 is now at ground potential, thus a 1 input is applied to each input of gate 236. This causes a 0 output from the gate 236 and the output state of gate 252 now changes from 0 to 1. The output of gate 246 does not change at this time.

If the input pulse remains a logic 1, only the input to gate 76 from gate 94 via path 102 is a 0. The other two inputs have each changed to a 1. This condition will not change until the input timer times out. Therefore, if the input pulse exceeds the predetermined time duration of the input timer, than gate 76 will have a logic 1 applied to each of its three inputs and the output will change state from 1 to 0. This first predetermined time interval may have different values depending upon the use to be made of the pulse corrector. However, in a preferred embodiment of this invention, the input timing circuit creates a predetermined time interval of about 33 ms. Thus the input pulse must be of a time duration in excess of 33 ms or for a split pulse the accumulated time interval must equal the 33 ms length in orderfor the input timer to time out. Once the input timer has timed out and gate 76 has inputs such that the output is changed from the 1 state to the 0 state, the output timer gate 140 immediately changes from the 0 state to the 1 state. In addition, this change of state affects the input of gate 72 such that a zero now appears on lead 106 and causes the output of gate 72 to change state to a logic 1 thereby resetting capacitor 80 and turning on transistor 86. With transistor 86 turned on, gate 94 has a 0 on one input and thus the output of 94 changes back to 1.

As hereinbefore noted, the output of gate 94 is applied to the input of the guard function timer. With a 1 applied to the input to the guard function timer, the state is inverted through each stage of the logic input to the timer, and the output of gate 208 changes from 0 to 1, therefore back biasing diode 224 as before. At the same time the inputs to gate 216 are each 1, and the output of the gate becomes 0 thus applying a negative voltage to the base of transistor 228 such that the transistor is maintained in the off condition for an additional 182 ms. Thus the state of the guard function timer is retained for approximately 225 ms as follows: 10 ms + 33 ms + 182 ms = 225 ms. Thus the output logic states from the guard function timer remain the same and each of these are, as before noted, a 1 applied to lead 254 and a 1 applied to lead 256.

Referring again to the output timer, the timing and logic circuitry input begins with a flip of the input states to gate 142. Prior to the transition of the state of the input timer from 1 to 0, the input states to gate 142 were 1 along path 124 and 0 along path 26. Once the input timer timed out, the logic states supplied to these two inputs which each reversed so that the output should be a 1 state. However, with a 0 applied to junction 122 along path 136, the voltage divider consisting of resistors 160, junction 144, path 146, junction 148 and resistor 162 provides a −3 volt level at the output of gate 142. The initial effect is to turn transistor 158 off for a period of approximately 27 ms. If during this interval gate 76 again has a 1 output, then gate 142 clamps to 0 (−5 volts) and another negative voltage step is applied to the base of transistor 158. Under these conditions, the total time that transistor 158 is off is 60 ms. With transistor 158 cut off the collector approaches ground and a 1 is applied to gate 176 through lead 172. Other inputs to gate 176 become 1 at the time the input timer timed out so that all inputs are in the 1 state, gate 176 has an output of 0, and this is supplied via path 178 to one input of gate 140. Thus, an input of 33 to 60 ms generates an output pulse of 60 ms.

If the input pulse to the input timer on lead 18 is greater than 60 ms (but less than 225 ms) transistor 158 will turn on after 27 ms. When the input goes to 0, gate 142 will have a 0 output because of the discharge delay created by the capacitor in the output of gate 140. This will cause the output timer to turn transistor 158 off for 33 ms. Thus the output pulse will have the same length as the original input pulse because the output timer has added the 33 ms that was subtracted by the input timer.

If the input pulse to the input timer is greater than 225 ms, then the output timer adds on 40 ms rather than 33 ms. This is accomplished by switching resistor 166 to −5 volts when the guard function timer times out. This lowers the charging potential applied to the capacitor at the base of transistor 158 and subsequently lengthens the time necessary to turn on transistor 158. If the input pulse has disappeared, and a new pulse occurs before transistor 158 has timed out (40 ms), gate 76 of the input timer will immediately go to 0 (since the input timer has been blocked by the guard function) and the output timer will reset waiting for the input to go to 0. Thus, any break in the pulse that is less than 40 ms (after the pulse has been present for at least 225 ms) will be ignored and bridged over.

What is claimed is:

1. Apparatus for correcting received telephone signaling pulses, which have at least a first predetermined pulse interval, said first predetermined pulse interval being less than a desired minimum corrected interval, to provide output pulses having at least minimum corrected "break" and "make" intervals, which comprises:

an input timing means having an input connected to receive the signaling pulses, an output, means for subtracting the first predetermined time interval from said received signaling pulses, thereby providing a minimum "make" interval, said subtracting means having an output; and, a first logic means having a plurality of inputs one of which is operatively connected to the input of said timing means and a second input being operatively connected to the output of said subtracting means, said first logic means conditioned by said input signaling pulses and said subtracting means to apply the remainder of said received signaling pulse to said output;

a guard function timing means having a first input operatively connected to the output of said subtracting means, a first delay means having its input connected to the first said input of said guard means, said first delay means providing a second predetermined time interval; a second logic means responsive to said first delay means and having one output operatively connected to an input of said first logic means of the input timing means, said first delay means maintaining the output state of said second logic means for said second predetermined time interval after the signaling pulse appears at the output of said subtracting means, thereby preventing splits having less than a pre-established duration from affecting the output of said second logic means; and, a second delay means providing a third predetermined time interval, said second delay means being operatively connected between said first delay means and said second logic means and being activated by said first delay means at the end of the second predetermined time interval to hold the output states of said second logic means for the third predetermined time interval; and an output timing means having an input operatively connected to the output of the first logic means of said input timing means, an output, a variable delay means, a third logic means having one input operatively connected to the output of said input timing means and another input operatively connected to said variable delay means, which means adds a variable time interval to the output pulse interval from the output timing means, thereby obtaining at least the minimum "break" interval.

2. Apparatus in accordance with claim 1 in which the subtracting means of the input timing means further comprises:

an input gating means having a plurality of inputs and an output, one input being connected to receive the input signaling pulse and another input being connected to the output of said input timing means, said gating means providing an output of one binary logic state when the inputs are both of one like state and of the opposite binary logic state for all other input conditions;

a time delay network having an input connected to the output of the input gating means, and an output, said time delay network being activated by the appearance of a pulse at the input to the gating means so that a first predetermined time interval is subtracted from the signaling pulse when the inputs to said input gating means are in said one like state; and an output gating means having a plurality of inputs and an output, one said input being connected to the output of said second logic means in said guard function timing means and another said input being connected to the output of said time delay network.

3. Apparatus as claimed in claim 2 in which the input gating means comprises a two input NAND-gate.

4. Apparatus as claimed in claim 3 in which the time delay network further comprises:

a first switching means having an input and an output, the switching means being responsive to the input signaling pulse such that the switching means changes state and holds the change in state only during the first predetermined time interval;

a first timing capacitor having one lead connected to the output of the input gating means and the other lead connected to the input of said switching means, said capacitor being charged when the output of the input gating means is in said opposite binary logic state; and a first resistor having one end connected to the output of said switching means and the other end connected to ground, said first resistor providing a discharge path for said timing capacitor when said switching means is in said one like state thereby creating said first predetermined time interval.

5. Apparatus in accordance with claim 4 in which the time delay network further comprises:

a second resistor having one end connected to the output of said input gating means and the other end connected to ground; said second resistor providing a second discharge path for said timing capacitor when the input signaling pulse momentarily is interrupted, said second discharge path providing a slower discharge rate than said first discharge path to integrate splits.

6. Apparatus in accordance with claim 1 in which the first logic means further comprises a three input NAND-gate.

7. Apparatus in accordance with claim 1 in which the guard function timing means further comprises:

a first inverting means having an input connected to the output of the subtracting means of said input timing means and an output;

a first time delay network providing a second predetermined time interval, having an input connected to the output of said first inverting means and an output;

a second inverting means having an input connected to the output of said first delay means to delay inversion of an input binary state at the output of the second inverting means by said second predetermined time interval;

a second time delay network having an input connected to the output of said second inverting means and an output, said second delay network providing the third predetermined time interval;

a third inverting means having an input connected to the output of said second time delay network and an output, said third inverting means providing a change in state after said second predetermined time interval and maintaining said change in state at its output for the duration of said third predetermined time interval; and a second logic means having two inputs and two outputs, one said input being connected to the output of said third inverting means and the other said input being connected to the output of said output timing means, one said output being operatively connected to one input of the first logic means and the second output being operatively connected to the subtracting means of said input means and to the variable delay means of said output means.

8. Apparatus in accordance with claim 7 in which said second time delay network further comprises:

a fourth inverting means having an input connected to the output of said second inverting means and an output;

a second switching means having an output connected to the input of said third inverting means and an input;

a second timing capacitor connected between the output of said fourth inverting means and the input of said second switching means;

a resistor connected at one end to the input of said switching means and the other end converted to ground, the combination of timing capacitor and resistor holding said second switching means in one said state for said third predetermined time interval when a signaling pulse is applied at the input to the input timing means;

a diode having its anode connected to the input of said second switching means and its cathode connected to the output of said second inverting means, said diode being forward biased following said second predetermined time interval which in turn causes said second switching means to change to said one state, said one state being maintained by the timing capacitor-resistor combination so that the one state is held during the first, second and third predetermined time intervals.

9. Apparatus in accordance with claim 8 in which said second logic means of the guard function timer further comprises:

a first NAND-gate having an output and two inputs, a first input being connected to the output of said third inverting means, a second said input being connected to the output of said output timing means, and an output which is connected to an input of said subtracting means to condition the output of said subtracting means for said first predetermined time interval;

a second NAND-gate having an output and two inputs, the first said input being connected to the output of said third inverting means and the second said input being connected to the output of said first NAND-gate of the second logic means, the output of said second NAND-gate is connected to one input of said first logic means in said input timing means and inhibits the logic means during said second predetermined time interval.

10. Apparatus as claimed in claim 1 in which the third delay means further comprises:

a first logic circuit having an output and two inputs, the first input being connected to the output of said input timing means and the other input being connected to the output of said output timing means, the output changing state only when both inputs are of one like state but not for other input conditions;

a voltage divider having one end connected to ground, the other end connected to the output of the input timing means, and the voltage divider junction connected to the output of said first logic circuit;

a third switching means having an input and an output;

a third timing capacitor having one lead connected to the output of said first logic circuit and the other input connected to the input of said third switching means, said third timing capacitor being charged such that the voltage at the output of the first logic circuit is positive with respect to the input of the third switching means, the change in potential caused by the input to said output timing means going from a first binary logic state to the other logic state changes the state of the third switching means and the change on the third timing capacitor holds this condition for a fourth predetermined time interval.

11. Apparatus as claimed in claim 10 in which the input signaling pulse exceeds a minimum "break" interval and said first logic circuit is caused to change state, the output of which adds charge to said third timing capacitor to increase the fourth predetermined time interval to a value that is equal to said first predetermined time interval.

12. Apparatus as claimed in claim 10 in which the duration of the input signaling pulse equals or exceeds that of said third predetermined time interval, so that said guard function timing means times out, the second output of the output logic means of the guard function timer changes state, said second output being connected to the junction of said third timing capacitor and said third switching means; the change in state of said output logic reduces the charging rate of said third timing capacitor which increases the fourth predetermined time duration to a value that is greater than said first predetermined time interval.

* * * * *

UNITED STATES PATENT OFFICE

CERTIFICATE OF CORRECTION

Patent No. 3,781,482 Dated December 25, 1973

Inventor(s) Otto G. Wisotzky, Tom L. Blackburn, Roy J. G. Urbach

It is certified that error appears in the above-identified patent and that said Letters Patent are hereby corrected as shown below:

Column 1, line 42, change "of" to -- or --. Column 2, line 2, delete "37 make"" and insert therefor -- "make" --; same column, line 36, change "discharage" to -- discharge --. Column 5, line 35, change "that" to -- the --; same column, line 44, change "236" to -- 23 --; and, same line, change "126" to -- 26 --; same column, line 65, after "72", change "no" to -- now --. Column 6, line 21, change "than" to -- then --; same column, line 49, change "than" to -- then --; same column, line 58, change "orderfor" to -- order for --. Column 7, line 25, change "which" to -- were --; same column, line 40, after "this" insert -- output --.

Signed and sealed this 16th day of July 1974.

(SEAL)
Attest:

McCOY M. GIBSON, JR.
Attesting Officer

C. MARSHALL DANN
Commissioner of Patents